(12) United States Patent
Rosenberg et al.

(10) Patent No.: US 9,579,788 B2
(45) Date of Patent: Feb. 28, 2017

(54) AUTOMATED TESTING AND VERIFICATION OF A ROBOTIC SYSTEM

(75) Inventors: Samuel Rosenberg, Pittsford, NY (US); Todd Jackson, Walworth, NY (US)

(73) Assignee: Ascent Ventures, LLC, Pittsford, NY (US)

( * ) Notice: Subject to any disclaimer, the term of this patent is extended or adjusted under 35 U.S.C. 154(b) by 1274 days.

(21) Appl. No.: 13/370,855

(22) Filed: Feb. 10, 2012

(65) Prior Publication Data

US 2013/0211782 A1    Aug. 15, 2013

(51) Int. Cl.
*G06F 15/00* (2006.01)
*B25J 9/16* (2006.01)

(52) U.S. Cl.
CPC ..................... *B25J 9/16* (2013.01)

(58) Field of Classification Search
CPC .......................................... B25J 9/16
USPC .............................. 702/182; 901/9
See application file for complete search history.

(56) References Cited

U.S. PATENT DOCUMENTS

| | | | |
|---|---|---|---|
| 4,815,006 A | 3/1989 | Andersson et al. | |
| 4,967,370 A | 10/1990 | Stern et al. | |
| 5,046,851 A | 9/1991 | Morgan | |
| 6,321,137 B1* | 11/2001 | De Smet | 700/245 |
| 6,571,148 B1 | 5/2003 | Wunder | |
| 6,812,665 B2 | 11/2004 | Gan et al. | |
| 7,050,937 B2 | 5/2006 | Lee | |
| 7,151,848 B1 | 12/2006 | Watanabe et al. | |
| 8,930,025 B2 | 1/2015 | Ishizaki | |
| 9,050,729 B2 | 6/2015 | Hao et al. | |
| 2005/0038563 A1 | 2/2005 | Rauf et al. | |
| 2008/0237445 A1* | 10/2008 | Ikeno | G01S 17/32 250/205 |
| 2009/0084766 A1 | 4/2009 | Moritz et al. | |
| 2009/0234501 A1 | 9/2009 | Ishizaki | |
| 2011/0029131 A1 | 2/2011 | Ban et al. | |
| 2011/0184558 A1* | 7/2011 | Jacob et al. | 700/259 |
| 2012/0239181 A1* | 9/2012 | Gu et al. | 700/176 |
| 2014/0156072 A1 | 6/2014 | Ban et al. | |

OTHER PUBLICATIONS

Shoureshi, An Optically Driven Learning Control for Industrial Manipulators, 1988, American Control Conference, 7 pp.*

* cited by examiner

*Primary Examiner* — Michael Nghiem
*Assistant Examiner* — Peter Ngo
(74) *Attorney, Agent, or Firm* — Brown & Michaels, PC

(57) ABSTRACT

Methods automatically and comprehensively self-test the operation, hardware, and programs of a robotic system to reveal problems in a robotic system. The system preferably evaluates repeatability of measurement by each distance sensor, an accuracy of measurement by each distance sensor, an accuracy of movement of any positioning joints used to position the robot arm, and an accuracy of at least one routine of the system control programs. The positioning joints may include one or more rotational joints or one or more translational joints. In some embodiments, the robotic system is a robotic pulse/echo layer thickness (PELT) system. When a robotic system has passed all of the tests, then the system performance has been verified. The inclusion of these self-tests allows a robotic PELT system owner to determine whether or not the robotic portion of a system is performing correctly.

15 Claims, 3 Drawing Sheets

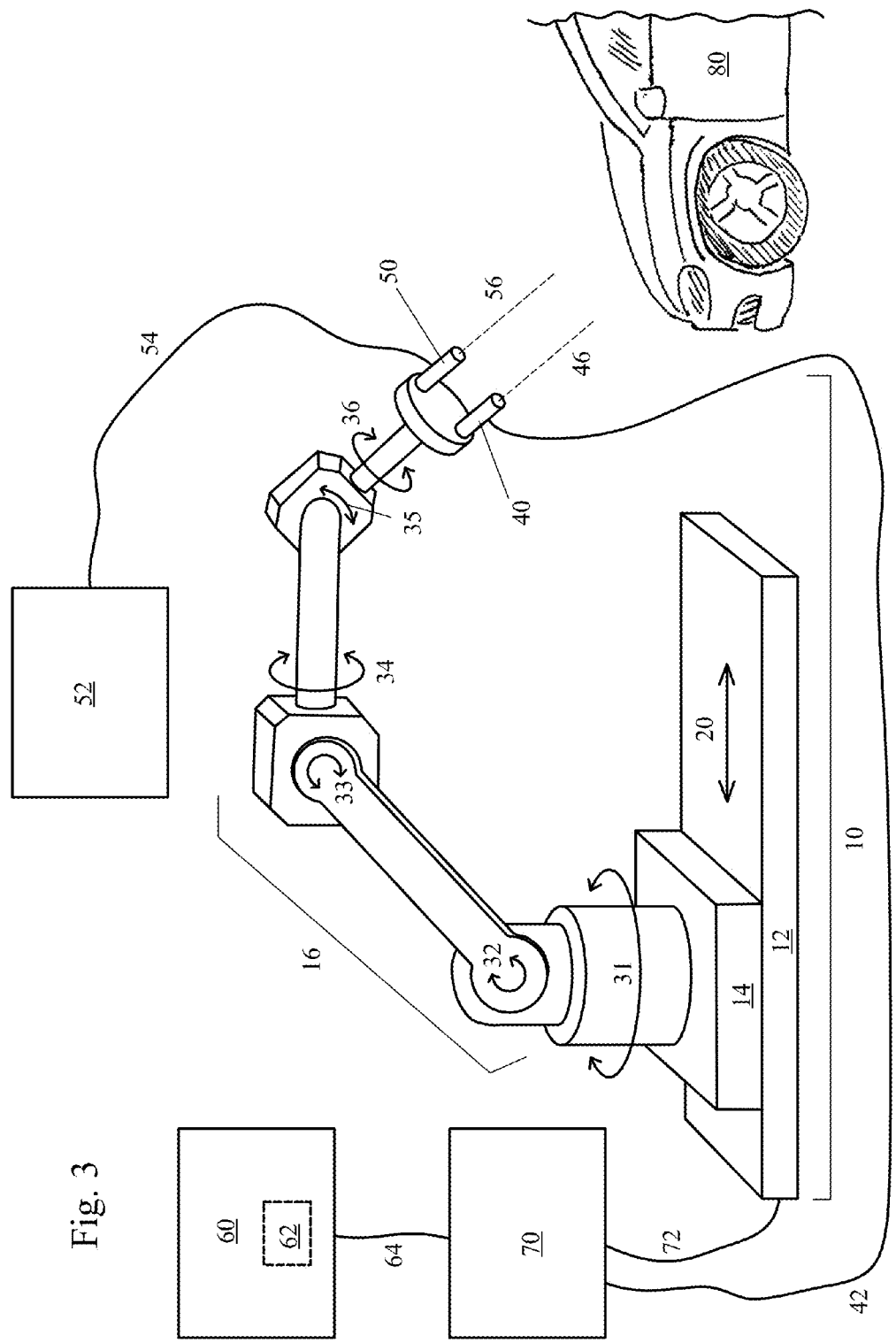

AUTOMATED TESTING AND VERIFICATION OF A ROBOTIC SYSTEM

BACKGROUND OF THE INVENTION

Field of the Invention

The invention pertains to the fields of hardware and program testing. More particularly, the invention pertains to methods for automatically testing the hardware and programs of robotic systems.

Description of Related Art

A robotic system typically includes one or more robots, tools wielded by the robot, sensors that enable the position of the robot to be sensed or stepper motors that move the positioning joints in steps to discrete angles or locations, firmware built into a robot controller that causes the robot to move in response to commands delivered to the controller, and software that sends commands to the robot controller so as to cause the robot to perform desired operations.

Robotic systems are employed in automated manufacturing operations in many situations, for example in factories. Of these robotic systems, some are dedicated to a particular task that is performed repetitively to objects without any alteration in robot motion from object to object. Other robotic systems require alteration of the motion of a robot based on variations in object size, orientation, color, or other object characteristics.

When a robotic system is designed to perform a particular task on objects whose characteristics vary from object to object, software is required to control the robotic system to perform the task. This software can be complex, and it is often difficult to completely test the software to ensure that the robotic system performs exactly as required on all possible objects. To compound the problem, the designer and installer of the robotic system may be a third-party system-integrator who has only partial knowledge of the complexity of each of the components of the robotic system. Consequently, the integrator may not possess sufficient knowledge to test the system so as to guarantee proper system performance. As a result, system performance issues can occur that are difficult to associate with a particular element of the robotic system. If the robotic system fails to perform its tasks correctly, it can be difficult and expensive to determine and correct the cause of the failure.

In addition to problems related to initial development of the robotic system, as the robotic system ages, its accuracy may decline and eventually reach a point where it no longer performs as required, and it can be difficult to localize which element of the system is causing the degradation.

A pulse/echo layer thickness (PELT) gauge is a measurement device that makes accurate measurements of the thicknesses of coatings applied to manufactured materials. A robotic PELT system is a robotic system to which a PELT gauge is added. The PELT gauge is thus the tool that is manipulated by the robotic system for the purpose of measuring coatings on materials. The entire robotic PELT system thus includes of one or more industrial robots, a distance measurement sensor mounted to the end of the arm of each robot, computer programs that control the robots, and a PELT 'tool' mounted to the end of each robot arm.

The PELT tool held by each robot includes an ultrasonic transducer. A primary objective of the robotic system is to ensure that the transducer is placed onto the surface of a test material with the front face of the transducer flat against the surface. In order for this to occur:

1. The robot needs to move accurately through three-dimensional space,

2. The distance sensor needs to be properly calibrated, and

3. The computer programs that control the robots need to be proper for the task and free of bugs.

U.S. Pat. No. 4,815,006, entitled "Method and Device for Calibrating a Sensor on an Industrial Robot" and issued to Andersson et al. on Mar. 21, 1989, describes a welding robot that uses a sensor for detecting a weld joint. The patent discloses a method for determining the relationship between the sensor coordinate system and the robot coordinate system in a manner that requires minimal manual operations. A calibration test object is used, and a calibration software program moves the sensor about the calibration object in order to determine the relationship between the sensor coordinates and the robot coordinates.

U.S. Pat. No. 4,967,370, entitled "Robot and Sensor Error Determination System" and issued to Stern et al. on Oct. 30, 1990, is similar to U.S. Pat. No. 4,815,006 in that both describe sensors on a robot, in this case a "vision" sensor, and the need to relate the sensor coordinate space to the robot coordinate space. The patent describes a test process that compares current sensor data with previously stored baseline or reference data. When differences are detected in the relationship between the sensor apparatus and the robot, the patent describes how to determine the source of the differences/error, such as robot positioning error or a change in orientation of the sensing apparatus mounted to the robot.

U.S. Pat. No. 6,571,148, entitled "System for Automatically Certifying the Accuracy of a Manufacturing Machine and Associated Methods" and issued to Wunder on May 27, 2003, discloses certifying, or checking the accuracy of, a computer-controlled manufacturing machine. This patent teaches making comparisons of successive outputs of a manufacturing machine. The accuracy and performance of the manufacturing machine is evaluated by monitoring and comparing the successive outputs of the manufacturing machine.

U.S. Pat. No. 7,050,937, entitled "Performance Measurement System" and issued to Lee on May 23, 2006, describes a software program for assessing the performance of a robotic semiconductor wafer handling system. The software requires a large amount of operator input and is thus neither automatic nor autonomous.

The above references are hereby incorporated by reference herein.

SUMMARY OF THE INVENTION

Methods automatically and comprehensively self-test the operation, hardware, and computer programs of a robotic system to reveal problems in the robotic system. The robotic system to be tested preferably includes at least one robot arm, at least one positioning joint for positioning the robot arm, at least one distance sensor coupled to the robot arm for measuring a test surface distance, a robot controller with computer programs for directing movement of the positioning joint, and a position-determining mechanism for determining each of the positions of the positioning joints or the robot arm, and system control programs. The positioning joints may include one or more rotational joints, one or more translational joints, or at least one rotational joint and at least one translational joint. In some embodiments, the position-determining mechanism includes a plurality of position sensors, which determine the position of the robot. In other embodiments, the position-determining mechanism includes a plurality of stepper motors, where the position of the robot is determined based on the positions of the stepper motors. The system preferably evaluates repeatability of measurement by each distance sensor, an accuracy of measurement by each distance sensor, an accuracy of movement of the rotational joints and any translational joints in positioning the robot arm, and an accuracy of at least one routine of the system control programs. In some embodiments, the robotic system is a robotic pulse/echo layer thickness (PELT) system. When a robotic system has passed all of the tests, then the system performance has been verified. The inclusion of these self-tests allows a robotic PELT system owner to determine whether or not the robotic portion of a system is performing correctly.

BRIEF DESCRIPTION OF THE DRAWINGS

FIG. 3 shows schematically a robotic system in an embodiment of the present invention.

DETAILED DESCRIPTION OF THE INVENTION

The present invention relates to testing and verifying the performance of a robotic system. In particular, it relates to automated testing and verification of a robotic system. In some embodiments, the method includes a series of sequential operations that test a robotic system's overall functionality as well as the accuracy of the robotic motion.

In some embodiments, an evaluating program directs the movement of the robot and one or more measurements made by the robot and evaluates the robot positions and measurements. In other embodiments, a directing program directs the movement of the robot and one or more measurements made by the robot and an evaluating program evaluates the robot positions and measurements. In some embodiments, the directing and evaluating programs run on a computer associated with the robotic system, such as a control computer or a tool computer. In some embodiments, the directing and evaluating programs run on the same computer that runs the control programs used to control the movements of the robot. In other embodiments, the evaluating and directing programs are run remotely from a computer not dedicated to the robotic system being evaluated.

Figure 1:
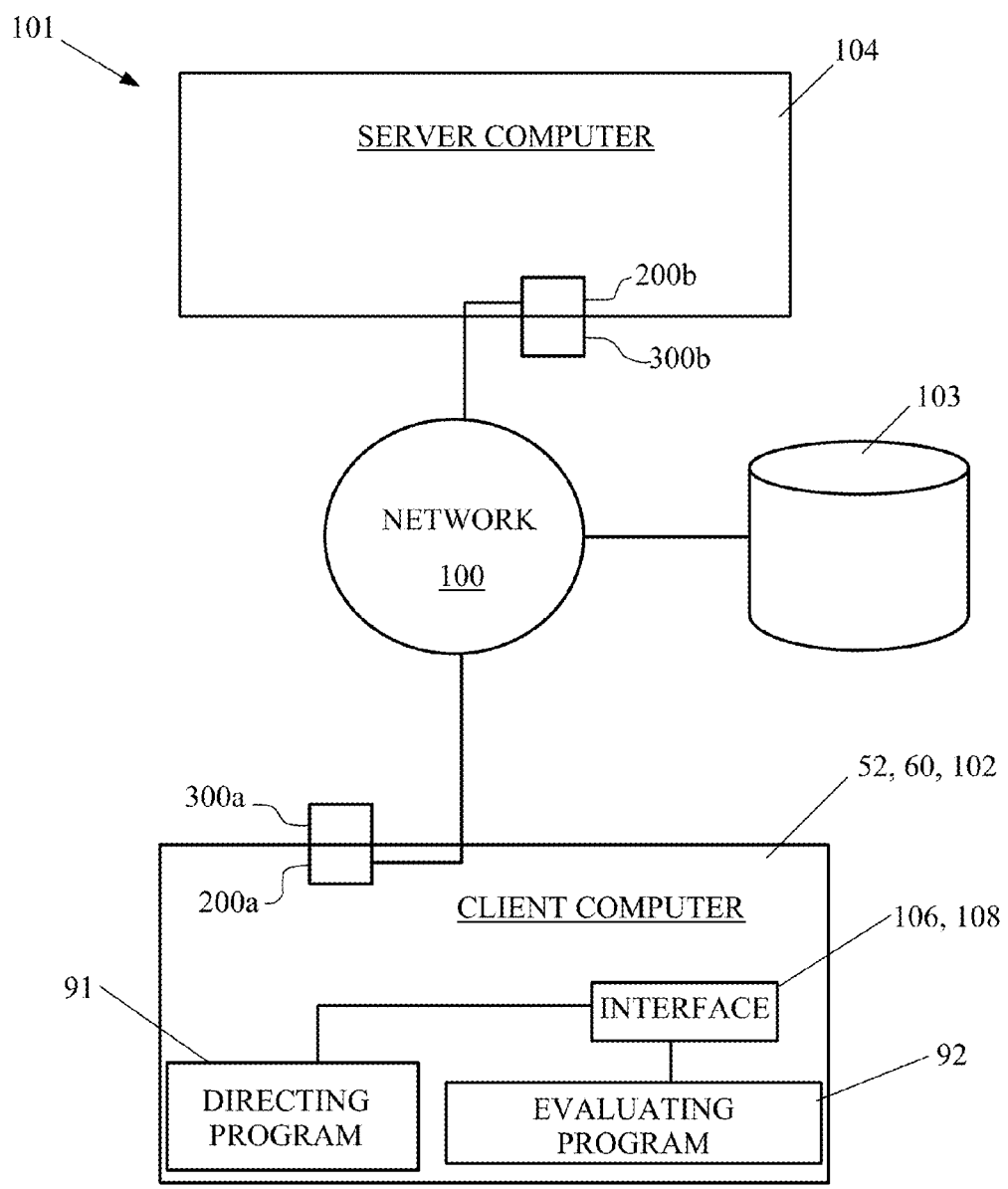
FIG. 1 shows schematically a possible data processing environment in which illustrative embodiments may be implemented.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, a network data processing system 101 is a network of computers in which illustrative embodiments may be implemented. The network data processing system 101 contains a network 100, which is the medium used to provide communication links between various devices and computers connected together within the network data processing system 101. The network 100 may include connections, such as wire, wireless communication links, or fiber optic cables.

In the depicted example, a client computer 102, a repository 103, and a server computer 104 connect to the network 100. In other exemplary embodiments, the network data processing system 101 may include additional client computers, storage devices, server computers, and other devices not shown. The client computer 102 includes a set of internal components 200*a* and a set of external components 300*a*, further illustrated in FIG. 2. The client computer 102 may be, for example, a mobile device, a cell phone, a personal digital assistant, a netbook, a laptop computer, a tablet computer, a desktop computer, or any other type of computing device. In some embodiments, the client computer 102 is the control computer 60 or the tool computer 52 of the robotic system of FIG. 3. The client computer 102 may contain a user interface 106 and/or other interfaces 108. The user interface 106 may accept commands and data entry from a user. The user interface 106 can be, for example, a command line interface, a graphical user interface (GUI), or a web user interface (WUI) through which a user can access a directing program 91 and/or an evaluating program 92 on the client computer 102, as shown in FIG. 1, or alternatively on the server computer 104. The server computer 104 includes a set of internal components 200*b* and a set of external components 300*b* illustrated in FIG. 2.

In the depicted example, the server computer 104 provides information, such as boot files, operating system images, and applications to the client computer 102. The server computer 104 can compute the information locally or extract the information from other computers on the network 100.

Figure 2:
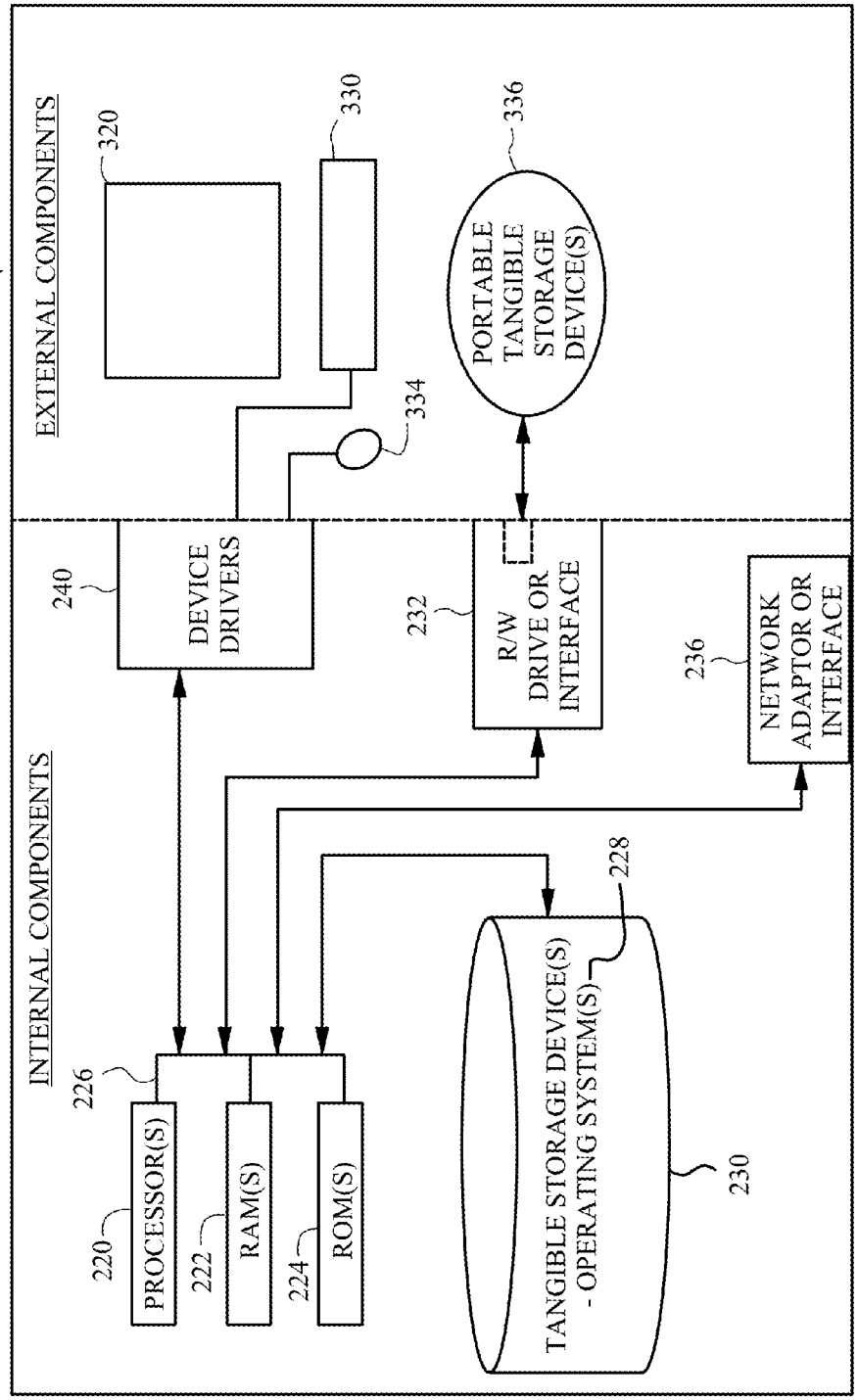
FIG. 2 shows internal and external components of a client computer and a server computer in which illustrative embodiments may be implemented.

Programs such as the directing program 91 and the evaluating program 92 may be stored on at least one of one or more computer-readable tangible storage devices 230 shown in FIG. 2, on at least one of one or more portable computer-readable tangible storage devices 336 as shown in FIG. 2, on a repository 103 connected to the network 100, or downloaded to a data processing system or other device for use. For example, programs such as the directing program 91 and the evaluating program 92 may be stored on at least one of one or more tangible storage devices 230 on the server computer 104 and downloaded to the client computer 102 over the network 100 for use on the client computer 102. Alternatively, the server computer 104 can be a web server, and programs such as the directing program 91 and the evaluating program 92 may be stored on at least one of the one or more tangible storage devices 230 on the server computer 104 and accessed on the client computer 102. The directing program 91 and the evaluating program 92 can be accessed on the client computer 102 through the interface 106. In other exemplary embodiments, programs such as the directing program 91 and the evaluating program 92 may be stored on at least one of one or more computer-readable tangible storage devices 230 on the client computer 102 or distributed between two or more servers.

In some embodiments, the network data processing system 101 is the Internet with the network 100 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the network data processing system 101 may also be implemented as a number of different types of networks, such as, for example, an intranet, a local area network (LAN), or a wide area network (WAN). FIG. 1 is intended as an example, and not as an architectural limitation, for the different illustrative embodiments.

FIG. 2 illustrates internal and external components of the client computer 102 and the server computer 104 in which illustrative embodiments may be implemented. In FIG. 2, the client computer 102 and the server computer 104 include respective sets of internal components 200a, 200b, and external components 300a, 300b. Each of the sets of internal components 200a, 200b includes one or more processors 220, one or more computer-readable RAMs 222 and one or more computer-readable ROMs 224 on one or more buses 226, and one or more operating systems 228 and one or more computer-readable tangible storage devices 230. The one or more operating systems 228, the directing program 91, and the evaluating program 92 are stored on one or more of the computer-readable tangible storage devices 230 for execution by one or more of the processors 220 via one or more of the RAMs 222 (which typically include cache memory). In the embodiment illustrated in FIG. 2, each of the computer-readable tangible storage devices 230 is a magnetic disk storage device of an internal hard drive. Alternatively, each of the computer-readable tangible storage devices 230 is a semiconductor storage device such as a ROM 224, EPROM, flash memory or any other computer-readable tangible storage device that can store a computer program and digital information.

Each set of internal components 200a, 200b also includes a R/W drive or interface 232 to read from and write to one or more portable computer-readable tangible storage devices 336 such as a CD-ROM, DVD, memory stick, magnetic tape, magnetic disk, optical disk, or semiconductor storage device. Enterprise meta-model topic map generator program 91, and version compare meta-model program 92 can be stored on one or more of the portable computer-readable tangible storage devices 336, read via R/W drive or interface 232 and loaded into hard drive 230.

Each set of internal components 200a, 200b also includes a network adapter or interface 236 such as a TCP/IP adapter card. The directing program 91 and the evaluating program 92 can be downloaded to the computer 102 and the server computer 104 from an external computer via a network (for example, the Internet, a local area network or other, wide area network) and a network adapter or interface 236. From the network adapter or interface 236, the directing program 91 and the evaluating program 92 are loaded into hard drive 230. The network may include copper wires, optical fibers, wireless transmission, routers, firewalls, switches, gateway computers, and/or edge servers.

Each of the sets of external components 300a, 300b includes a computer display monitor 320, a keyboard 330, and a computer mouse 334. Each of the sets of internal components 200a, 200b also includes device drivers 240 to interface to the computer display monitor 320, the keyboard 330, and the computer mouse 334. The device drivers 240, the R/W drive or interface 232 and the network adapter or interface 236 include hardware and computer programs (stored in the storage device 230 and/or the ROM 224).

The directing program 91 and the evaluating program 92 can be written in various programming languages including low-level, high-level, object-oriented or non object-oriented languages. Alternatively, the functions of the directing program 91 and the evaluating program 92 can be implemented in whole or in part by computer circuits and other hardware (not shown).

A positioning joint, as used herein, may be any rotational joint or any translational joint used in combination with any other positioning joints to move the robot arm to any predetermined position in three-dimensional space.

The robotic system preferably includes a position-determining mechanism. The position-determining mechanism preferably determines the position of each of the positioning joints, thereby determining the position of the robot arm. In some embodiments, the position-determining mechanism includes at least one position sensor and preferably a position sensor for each positioning joint. A position sensor, as used herein, may be any sensor, which measures the position of one or more of the movable portions of the robot. A robotic system preferably uses readings from the position sensors in combination as an internal self-check to determine the relative positions of one or more portions of the robot arm. In some embodiments, the position sensor is a potentiometer. In some embodiments, the position sensor is a linear position sensor. In some embodiments, the working range of the linear position sensor is in the range of about 10 mm to about 50 mm. In other embodiments, the working range of the linear position sensor is in the range of about 20 mm to about 600 mm. In some embodiments, the position sensor is a rotary position sensor. In some embodiments, the working range of the rotary position sensor is in the range of about 5° to about 20°. In other embodiments, the working range of the rotary position sensor is in the range of about 20° to about 160°.

In other embodiments, the position-determining mechanism includes at least one stepper motor and preferably a stepper motor for each positioning joint, each stepper motor setting a joint to one of a predetermined number of positions based on a set of discrete positions of the stepper motor. In such embodiments, the position of the robot is determined based on the position settings of the stepper motors. In such embodiments, the position-determining mechanism is an inherent function or aspect of the stepper motors used to position the joints.

In other embodiments, the position-determining mechanism includes at least one stepper motor and at least one position sensor and preferably a stepper motor or a position sensor for each positioning joint.

The robotic system preferably includes at least one distance sensor. A distance sensor as used herein may be any sensor, which remotely measures the distance from the distance sensor to the nearest object in a predetermined direction. In some embodiments, the distance sensor measures infrared reflected light from an infrared light-emitting diode (LED). In some embodiments, the working range of the distance sensor is in the range of about 2 cm to about 20 cm. In other embodiments, the distance sensor uses triangulation from an infrared LED, a red LED, a laser, or a laser diode to remotely measure the distance. In some embodiments, the working range of the distance sensor is in the range of about 4 cm to about 200 cm. In yet other embodiments, the distance sensor is an ultrasonic sensor. In some embodiments, the working range of the distance sensor is in the range of about 3 cm to about 600 cm. In other embodiments, the distance sensor is a sonar sensor.

A number of publications teach various manual methods for testing components of robotic systems. These publications describe limited methods that can be used to verify one aspect of the system's performance, but not a comprehensive test that is performed automatically and autonomously to ensure that the entire robotic system is functioning properly, including the computer programs controlling the robot and the directing or evaluating programs themselves.

In some embodiments of the present invention, the system includes the ability to automatically test the performance of an entire robotic system. The automatic testing is faster than manual testing and eliminates human errors and subjectivity.

In some embodiments, the method includes testing the operation and accuracy of each of the individual elements of a robotic system. The method is faster than manual testing and eliminates human errors and subjectivity. The robotic system elements being tested preferably include the robot controller firmware, the robot mastering data, definitions for the spatial coordinates of the robot tools, the built-in position-determining mechanisms that determine the robot joint angles/positions and provide feedback to the robot control system and firmware, the sensors that measure the position of objects near the robot, and the computer programs that have been written to instruct the robot how to perform operations on a work piece and to move relative to that work piece.

In some embodiments, the system tests a robotic system that does not require dedicated reference standards.

In some embodiments, the system tests a robotic system at regular time points. The time points may be daily, after each system power-up, after performance of each service action on the system, or after any combination of these time points, thereby ensuring that any compromise or degradation in system performance is detected in a timely manner.

In some embodiments, it is possible to readily verify the performance of the robotic system at any time point throughout the system's operational life, such as after sensor or robot components have been replaced or upgraded or after any alterations have been made to the robot programming.

In contrast to U.S. Pat. No. 4,815,006, which requires the use of a dedicated reference standard such as a calibration block, methods of the present invention preferably do not require dedicated reference standards. In some embodiments, however, a reference block may be used. The relationships between the tools that are mounted on the robot and the robot itself are preferably always predetermined, and thus there is no need to relate them to each other. If a tool is damaged or otherwise altered, for example bent, such that the relationship between the tool and the robot deviates from what is given, the tool is preferably replaced. Furthermore, a series of test and verifications preferably comprehensively tests more than just the spatial relationship between the robot and a tool or sensor attached to it. In some embodiments, the series of test and verifications comprehensively tests the entire robotic system.

In contrast to U.S. Pat. No. 4,967,370, methods of the present invention preferably do not require referral to previously stored reference data.

In contrast to U.S. Pat. No. 6,571,148, which compares current testing or verification results with previous results in a relative sense, the methods preferably ensure that the system is performing correctly in an absolute sense.

The above-described problems of initial and long-term system performance verification and debugging are preferably solved using a series of system self-tests that verify sensor accuracy, robot positioning accuracy, and computer program performance. These self-tests may be employed both during initial verification of robotic system performance and periodically thereafter to verify continuing proper system performance. In some embodiments, a sensor that is capable of detecting the position of the robot relative to a nearby surface is added to the robotic system, and self-test directing or evaluating programs are added to the computer system. The self-test directing or evaluating programs are preferably capable of causing the robotic system to execute a series of robot motions in conjunction with measurements made using the position sensor. The combination of robotic motions and sensor measurements enables the robotic system performance to be verified. A complication in such an approach is that the self-test directing or evaluating programs themselves can generate an incorrect system performance assessment, and thus must itself be verified during the self-test operation.

When a robot PELT system is installed in a manufacturing plant, a system integrator is generally responsible for calibrating the robot and distance sensor and for the development of the computer programs that control the robot. The integrator is also generally responsible for testing these items to ensure that the system functions as specified such that the system accurately and precisely moves the robot to position the PELT tool at a particular point in three-dimensional space, when the system is commanded to do so.

Unfortunately, as has been observed in several robot PELT systems, an integrator's testing may be inadequate or incomplete, thereby resulting in a robotic system that performs inaccurately. In addition, the integrator may perform some system tests subjectively, which also adds to the system inaccuracy. In some cases, the robot and robot control computer programs may appear to work properly initially but may then exhibit problems at a future point in time. It is also possible for future alterations of the computer programs and/or system component upgrades to introduce inaccuracies into a properly functioning robot PELT system. For all these reasons, a better approach to system verification is desirable.

When problems develop in a robotic PELT system, the failure is rarely catastrophic such as the complete failure of a robot, which is not difficult to diagnose. Rather, robotic PELT system performance problems are usually subtle, resulting in poor or less than optimal placement of the PELT transducer against the surface being tested. Consequently, the problem is typically observed as poor accuracy in the measurement data being produced by the PELT gauge. Thus, the owner of the robotic system suspects the performance problem to be due to the PELT gauge hardware and computer programs rather than being due to a problem with the robotic portion of the system. The system owner then contacts the PELT gauge manufacturer to fix the PELT hardware, when the problem is actually due to robotic system elements that are serviced by other parties. Resolution of the problem is thus delayed, and it would therefore be very beneficial for the owner of a robotic PELT system to be able to determine what element of the system is causing a performance problem so that the system may be repaired quickly by the proper service company.

The above problems of performance testing are preferably solved by implementing an automated and comprehensive series of tests that form a self-diagnosis portion of the robotic PELT system. Such self-tests may be run when the system is first installed and at any time thereafter, either periodically or whenever a performance issue has occurred, in order to verify the functionality status of the robotic PELT system and to determine what service provider should be contacted. These tests may also be run immediately after a robotic system is serviced or after system upgrades are performed so as to verify that the service operation has not degraded the system performance.

Although the methods described herein provide a solution to the above issues for robotic PELT systems which incorporate a distance sensor, the problem described above also exists in many other types of robotic systems, especially those used in manufacturing. As such, the methods described herein may be used or adapted to provide a solution to the performance problems in other robotic systems, not just robotic PELT systems. For example, the methods may be used in any robotic system where any type of sensor accomplishes the task of sensing the distance from the robot wrist to a surface.

A self-test and verification method preferably requires a sequence of self-tests that verify the functionality of a robotic PELT system and indicate which portions of the system are not functioning properly, if any. The tests preferably must be non-subjective and autonomous in that no human intervention is required for the tests to be performed, aside from initiating the testing sequence in some instances. The tests preferably must also be comprehensive in that the functionality and performance of the entire system, including, but not limited to, robot accuracy, sensor accuracy, the execution of robot control firmware, the execution of system control programs, and the performance of the self-test directing or evaluating programs themselves, is determined. The tests preferably must be designed to avoid the need for calibrated reference standards and preferably must be capable of being run at any point in time during the operational lifetime of the robotic system.

A robotic system for self-testing by method of the present invention preferably includes a robot, a robot controller with built-in firmware that controls the robot in response to received commands, and computer programs that have been written to instruct the robot as to what motions to make and when to make them. The robot preferably possesses a position-determining mechanism that is an inherent part of the robot that determines robot joint angles and provides feedback positional data to the robot controller. In some embodiments, the system uses robot joint calibration data. In order for the robotic system to move accurately and precisely, all elements of the system must be properly functioning and calibrated, and methods preferably determine whether all such elements are properly functioning and calibrated.

FIG. 3 shows a preferred robotic system for testing using methods of the present invention. The moving parts of the robot 10 sit on a base 12 that is preferably stationary to provide a reference point for the position of the other parts of the robot 10. A stage 14 sits on the base 12 and is translatable with respect to the base 12 along a linear axis 20. The stage 14 houses the memory of the robot, including robot mastering data. The robot arm 16 extends from the top of the stage 14. The robot arm 16 is rotatable along six rotational axes 31, 32, 33, 34, 35, 36, which, in combination with translation along the linear axis 20, allows the robot arm 16 to position tools 40, 50 attached to the end of the arm at a particular location in space with high degrees of precision and accuracy.

A system control computer 60 includes a control program 62 for implementation of methods of the present invention. The system control computer 60 communicates with a robot controller 70 to direct the movement of the robot 10. In some embodiments, the system control computer 60 communicates with the robot controller 70 by way of a cable 64 connecting the system control computer 60 and the robot controller 70, and the robot controller 70 communicates with the robot 10 by way of a cable 72 connecting the robot controller 70 and the robot 10. In other embodiments, communication between the system control computer 60 and the robot controller 70 occurs wirelessly. In other embodiments, communication between the robot controller 70 and the robot 10 occurs wirelessly. In yet other embodiments, both communication between the system control computer 60 and the robot controller 70 and communication between the robot controller 70 and the robot 10 occurs wirelessly. In some embodiments, a tool 40 communicates with the robot controller 70 by way of a cable 42. In other embodiments, communication between the tool 40 and the robot controller 70 occurs wirelessly.

In some embodiments, a tool 50 communicates with a tool computer 52 by way of a cable 54. In other embodiments, communication between the tool 50 and the tool computer 52 occurs wirelessly.

The tools 40, 50 act along longitudinal axes 46, 56, respectively, to interact with a test object 80. In a preferred embodiment, one tool 40 is a distance sensor, the other tool 50 is a PELT gauge in communication with a PELT computer 52, and the test object 80 is an object with a surface layer thickness to be measured, and, more preferably, a vehicle with paint coating thicknesses to be measured.

In a preferred embodiment of a robotic system, a PELT gauge ultrasonic transducer tool and one or more distance sensors are attached to the robot. The distance sensors are used to detect objects in the vicinity of the robot. Computer programs are added that interpret the position of detected objects via the data from the distance sensor or sensors, and is capable of instructing the robotic system to place the ultrasonic transducer against the surface of the detected object.

The functionality of a robotic system may be adversely affected by inaccuracies with the robot calibration, errors related to the built-in position-determining mechanism that determines the robot joint positions, and other errors described below. In the field of robotics, the term "mastering" is used to describe the process of calibrating a robot, in particular, the process of establishing reference or 'zero' positions for the robot joints by defining the relationships between the robot's self-determined position values and the actual positions of the robot joints. Another term that is used to describe the calibration of a robot is "robot kinematic identification". Obviously, errors made in the robotic system mastering cause robotic system performance problems, since the robot position-determining mechanism is not calibrated, and the robot does not move properly. In some robots, the mastering values are stored in solid-state electronic memory that is powered by a battery, and when that battery dies or fails to provide sufficient power, the mastering values are lost, resulting in un-calibrated robotic system motion.

The term "tool center point" or TCP, as used herein, describes spatial coordinate values for the tool or tools attached to a robot. In particular, while a tool is mounted to a reference location on a robot, the active part of the tool is typically in a different position relative to the reference location. The TCP data values define the active part of the tool relative to the reference location on the robot and are used in planning the robotic system motion when positioning the tool to perform the required task. If the TCP values contain errors, the robotic system improperly positions the tool or tools. Thus, in an overall self-testing of the system, the TCP values must also be verified.

It is typical for robotic system testing and verification to be performed manually by an operator or technician. Unfortunately, manual testing is time-consuming and subject to operator error and subjectivity. In addition, it may only be possible to perform manual testing when a system is initially installed. However, throughout the life of the system, sensor failures may occur, robot control programs may be modified or updated, and robot and sensor accuracy may degrade. Therefore, it is highly desirable to have a robotic system that automatically tests itself and that can perform such testing at regular intervals after the initial installation.

In some embodiments, a series of test and verification routines are run in sequence and automatically test the individual hardware system elements, individual computer program system elements, and overall robotic system functionality.

Although the following described embodiments relate to an industrial robot used specifically in a robotic PELT system, the systems and methods may also be employed in many other types of robotic systems.

In a robotic PELT application, an industrial robotic system obtains thickness measurements of coatings that have been applied to surfaces. In some embodiments, the surface is a painted automotive panel surface. The system employs an ultrasonic measurement sensor mounted to the end of a robot arm for these thickness measurements. The robotic system senses the distance and orientation of the surfaces through the use of a distance sensor mounted to the robot arm.

Although a robotic system may have as few as a single rotational or translational axis, the industrial robot in a robotic PELT system typically has seven axes, or seven degrees of freedom. Six of the degrees of freedom correspond to rotational joints 31, 32, 33, 34, 35, 36 in the robot arm. The seventh degree of freedom is a linear joint in the form of a linear translation stage 20 located between the robot arm and the robot mounting surface and along which the robot can slide. In many robotic maneuvers, more than one of the joints are moving simultaneously to relocate the robot arm to a new position. In many robotic maneuvers, all of the joints move simultaneously to effect relocation of the robot arm to a new position.

The series of test routines described below utilize one or more test targets located in the vicinity of the robot. None of the test targets needs to be a precision reference. For the majority of the tests described below, the test targets may be either planar or non-planar surfaces, including cylindrically or spherically curved surfaces. A spherical test surface is advantageous in that it provides an infinite number of different surface orientations relative to the robot, thereby enabling testing with many more combinations of robot positions and joint angles than would be possible with planar test surfaces.

The test sequence verifies the accuracy of different groups of robotic system elements and determines whether or not the system is performing properly and with acceptable accuracy. Each test in the test sequence causes the robotic system to move the robot in a manner that is verifiable. If the robot does not move as specified, the tests establish what element or elements of the robotic system are likely to be responsible for the failure. The test sequence is preferably designed such that if the robotic system passes every test in the test sequence, then every individual element of the system, as well as the system as a whole, is functioning as specified.

There are preferably three series of test routines. The first series of tests evaluates the performance of the distance sensor as well as any hardware used for distance sensor data acquisition and signal-conditioning. The subsequent two test series require a properly functioning distance sensor, and consequently they should only be run after the accuracy of the distance sensor has been verified. The second series of tests verifies the accuracy of the robot movements and the firmware that controls the robot motions in general. The third series of tests verifies the computer programs that control the robot motions and operations for the specific PELT gauge-related task or tasks that the robot is designed to perform. In a preferred embodiment, the computer programs that position the robot in a particular orientation relative to an object are tested along with the computer programs that manipulate a tool attached to the end of the robot.

In a robot PELT system, a distance measurement sensor is preferably mounted to the end of the robot arm with a predetermined orientation relative to the end of the robot arm. A specific predetermined orientation is not required, and in a general sense the distance sensor may be mounted in one of many different orientations. An additional element of the robot arm is the 'wrist', which is the solid member of the robot arm that is located after the last rotational joint. For simplicity of explanation of the method, it is convenient to assume, although it is not a requirement, that the distance sensor measurement axis, which is the line along which the distance sensor makes its measurements, is oriented parallel to the axis of the robot wrist. This orientation allows for the design of robotic system control programs to be simpler since, by orienting the robot wrist, the distance sensor is simultaneously oriented. The offset between the distance sensor axis and the robot wrist axis allows the distance sensor to be swept in an arc by wrist rotation, an aspect that is useful during the self-testing process.

The First Series of System Self-Tests

The first series of self-tests verifies the ability of the robot to detect and locate an object. In the case of a robotic PELT system, these tests verify the functionality of a distance sensor that is attached to the robot.

Distance Sensor Repeatability Test

A distance sensor repeatability test is preferably run first to evaluate the distance sensor measurement uncertainty and to determine whether the sensor readings are repeatable to within the precision required. To perform this test, the robotic system moves the distance sensor, which is mounted to the end of the robot arm, so that the distance sensor is aimed at the surface of a test target. The test target position and surface shape are preferably predetermined, and the positional data is preferably programmed into the robotic control system programs, although it is possible for the robotic system to search for and use any suitable test surface such as a floor, a wall, or a portion of the robot's own body for this repeatability test. The robotic system positions the distance sensor such that the distance between the sensor and the test surface is approximately in the center of the distance sensor's measurement range. This positioning may be performed using data obtained from the distance sensor. The distance sensor does not need to be oriented perpendicular to the test surface but must be held stationary with respect to the surface. A series of distance measurements with the distance sensor being held stationary with respect to the test surface is received by the computer and stored in a repository. The measurement value differences are compared to a predetermined tolerance value that is representative of the distance sensor repeatability, for example by the evaluating program, and the number of measurement values taken is predetermined to provide statistically valid data on the distance sensor performance. In some embodiments, the predetermined tolerance value is the tolerance value for repeatability of the distance sensor provided by the manufacturer of the distance sensor. The test may be repeated for different distances within the detection range of the distance sensor by repositioning the distance sensor or the test surface.

If the robotic system fails the distance sensor repeatability test based on the measurement values obtained, this indicates a problem with the distance sensor element of the robotic system. Since use of the distance sensor is a critical aspect for performing the complete series of tests, any sensor problem should be addressed and corrected before proceeding further with the test sequence.

Distance Sensor Verification Test

A distance sensor verification test is preferably run immediately after the completion of a successful distance sensor repeatability test. The distance sensor verification test verifies the range and linearity of the distance sensor, and verifies that the distance sensor measurements agree with the positional data provided by the robot's built-in position-determining mechanism. This test also verifies that the longitudinal axis of the distance sensor is actually parallel to the axis that is pre-defined in the data used by the robot controller computer programs.

To perform the distance sensor verification test, the robotic system first aims the distance sensor at the test target used in the distance sensor repeatability test or a different test surface.

Once the distance sensor is directed toward the test surface, the distance sensor is translated along its measurement axis, as defined in the system computer programs, until the sensor is positioned at the low end of its operational range relative to the test surface. The distance sensor value and the robot's positional data are each stored in a repository. The robot is then moved a short distance away from the test surface along the sensor's measurement axis, preferably a fraction of the distance sensor's overall measurement range. The distance sensor value at the new position is recorded and stored in a repository. Although not required, the distance sensor may be oriented such that its axis is parallel to a linear translation joint of the robot. In this case, the robot motion may be simplified to include only translation along the linear axis rather than requiring the motion of multiple rotation joints. Regardless of which method of motion is chosen, the difference between the new distance sensor value and the position value computed using the robot's positional data from the position-determining mechanism must be less than the combined predetermined tolerance value of the robot's positional data accuracy and the distance sensor measurement accuracy. Subsequently, the robot moves the distance sensor away from the test surface, preferably in equal small steps, with the difference between the new distance sensor value and the position value computed using the robot's positional data from the position-determining mechanism being compared to the combined predetermined tolerance value of the robot's positional data accuracy and the distance sensor measurement accuracy at each position, until the distance sensor reaches or approaches its maximal measurement range. In order for the robotic system to pass this test, the difference between the distance sensor value and the position value computed using the robot's positional data from the position-determining mechanism must be less than the predetermined tolerance value at each measurement location.

If the robotic system fails the distance sensor verification test, it indicates one or more of the following: the distance sensor is not linear, the distance sensor is malfunctioning, the distance sensor is not oriented parallel to the robot wrist, the robot is not properly calibrated, or the robot is not moving accurately and precisely. Since the use of the distance sensor is a critical aspect for performing the full test sequence, the reasons for failure of the test by the robotic system must be identified and corrected before proceeding with further tests. If the robotic system passes the distance sensor verification test, the distance sensor is performing properly, and the robot is moving accurately in the types of motions employed in this test.

A distance sensor verification test, as described above, like the other tests described herein, does not require the use of a reference standard. There are, however, alternative tests that may achieve the objectives of the distance sensor verification test. One such alternative test utilizes a reference standard in the form of a stepped calibration block. The calibration block includes a flat base, a flat area parallel to the base that is used to determine the orientation of the calibration block, and various defined levels or steps which may be in the form of a stair step pattern. The steps are preferably sized to correspond to an increment in the range of the distance sensor. In a distance sensor verification test using a calibration block, the robot first moves to a predetermined programmed fixed position in space that directs the distance sensor to the flat area parallel to the base which may be, for exemplary purposes, near the minimum end of the distance sensor range.

Next, a normalization routine is run so that the distance sensor is oriented perpendicular to the block. The distance sensor reading is then stored in a repository. The robot then moves laterally so that the distance sensor is positioned over the next step or level down from the flat area parallel to the base. A distance sensor value at the new position is recorded and stored in a repository. The difference between the distance sensor values and the defined reference standard step distance is compared to a predetermined tolerance value that is representative of the combined robot positional accuracy and distance sensor accuracy. In some embodiments, the predetermined tolerance value is equal to the combined robot positional accuracy and distance sensor accuracy. The robot then moves the distance sensor laterally over each of the remaining successive steps of the calibration block, with the difference in distance sensor measurements being checked against the defined reference standard step distances, until the distance sensor approaches or reaches its maximal range. In order for the robotic system to pass this distance sensor verification test, the difference between the distance sensor readings and the robot positional data at each measurement location must be less than the predetermined tolerance value that is representative of the robot positional accuracy and the distance sensor accuracy for the step size of the calibration block.

Once the robotic system has successfully passed the above-described first series of tests, a second series of tests are run that verify the accuracy of the motion of the robot joints.

The Second Series of System Self-Tests

The second series of tests verifies the accuracy of the robot movements based on the robot joint or axis calibrations, in effect verifying the robot mastering values for the system, the built-in position-determining mechanism that is part of the robot and that is used by the robot to establish the robot's joint positions and orientation in space, and the firmware that controls the robot motion. Two versions of the rotational joint accuracy test are described below, and either or both versions may be used within the spirit of the present invention.

Rotational Robot Joint Accuracy Test, Version A

The rotational robot joint accuracy test verifies the differential (small change in angle) and integral (large changes in angle) accuracy of each robot joint. During this test, all of the robot's rotational joints are preferably tested substantially through their entire ranges of motion. For all of the rotational joints, the accuracy of the robot positioning is verified by orientating the distance sensor, which preferably recently passed the first series of system self-tests, towards a particular point on a wall, floor, or other stationary test object. As the robot sets a particular joint to a given angle during the test routine, the robot also preferably sets the other joints such that the distance sensor remains directed towards the same point on the target to test the six degrees of freedom corresponding to the rotational joints. The seventh linear robot axis is tested as a separate special case. Failure of the robotic system to pass any of the joint accuracy tests indicates an issue with the robot joint calibration data, position-determining mechanism, or the robot control firmware.

The target point to be used for testing the first joint may be located on any type of stationary surface, including, but not limited to, a sphere. As described earlier, for some portions of the test routines, a spherical test surface, with its infinite number of surface orientations, offers the advantage of enabling testing of a greater range of possible joint positions than would be possible for other types of surfaces.

In the rotational robot joint accuracy test, the first rotational joint of the robot is preferably tested first. The first joint is located at the base of the robot. Each successive test is used to verify the performance of the robot joints located farther from the base. The seventh axis is the linear rail along which the entire robot may be translated.

For a particular robotic system, the test target points and required robot orientations are preferably predetermined and the information is stored in a data repository as pre-programmed positions in a program such as the directing program or the evaluating program. Although the robotic system may be programmed to autonomously locate and use any surface, such as a nearby automobile body or the surface upon which the robot is mounted, safety considerations may dictate that the test surface locations be predetermined to prevent robot collision with unexpected objects and prevent damage to the robot or to the unexpected object. The manner in which the robotic system may autonomously locate and use a surface may be as follows:

1. The robotic system directs the distance sensor in the direction toward where a test surface is anticipated to lie. This surface may be a floor, the robot base, or the location where work objects are typically located.

2. The robotic system obtains a distance sensor reading. If a surface is present within the distance sensor detection range, then the surface position is known and it can be used for subsequent testing of the robotic system.

3. If no surface is detected within the distance sensor range, then there is clear space in front of the distance sensor to the extent of the distance sensor measurement range. Therefore, the robot may move the distance sensor forward in that direction without risk of colliding with a surface. To ensure that a collision does not occur, such movement should be limited to less than the distance sensor's maximum range. Then during or after this forward movement, further distance sensor readings may be taken until a surface is detected. At that point the surface position becomes known and it may be used for subsequent testing of the robotic system.

For testing the first robot joint at the base of the robot, the joint is rotated near the start of its range of motion, and the rest of the robot joints are oriented such that the distance sensor is directed at a particular point on a test surface. The point is chosen such that the robot is able to rotate the first joint and keep the distance sensor directed at the same point by adjusting other robot joints. In some embodiments, the sensor tool center point is held constant such that there should be no change in the measured distance during the test, although the distance between the distance sensor and the test point need not be held constant as the robot joints are adjusted as long as the distance remains within the measurement range of the distance sensor.

With the distance sensor directed towards a measurement point on the test surface as described above, a distance measurement is obtained and stored. Next, the computer program calculates the position of the measurement point on the test surface relative to the robot.

The robot then rotates the first joint a fixed small increment, such as about one degree. The robot then adjusts the other robot joints so as to direct the distance sensor back to the measurement point. The new position of the distance sensor is calculated relative to the measurement point, and the distance between them is also calculated. A new distance sensor measurement is recorded and compared to the predicted value. In order for the robotic system to pass the rotational robot joint accuracy test, the values must agree within a predetermined tolerance representative of the distance sensor and the robot positioning. In some embodiments, the predetermined tolerance is the sum of the distance sensor accuracy and the robot positioning accuracy. This process is then repeated for additional small increments to the angle of the first robot joint, and the predicted measurements are compared to actual measurements at each new position to determine whether the difference is less than a predetermined tolerance value based on the predicted distance and the tolerances. After a predetermined number of small increments have been tested, this portion of the test is complete.

If each calculated difference is less than its associated predetermined tolerance value based on the predicted distance and the tolerances for this first portion of the joint range, the first robot joint is then rotated by a large increment, such as 45 degrees. The other robot joints are again adjusted such that the distance sensor is directed at the same measurement point. If this is not possible, then a different target point or a different surface may be used. When a new test point is used, the distance sensor is used to measure the location of the 'new' point relative to the 'old' point and to the robot itself, to provide continuity for the measurement data throughout the range of motion of the robot joint.

The previous small angle test is then repeated in which the first robot joint is moved through small angles, such as one-degree increments, and the distance sensor readings are compared to predicted values.

This small angle test is then repeated for additional large increment positions of the first joint, until the first joint has reached the end of its range of motion. The entire set of measurement data values, whether measured from a single test location or from multiple locations, may then be evaluated to determine the differential accuracy (small angular adjustments) and integral accuracy (large joint motions) of the first joint. Once the calculated differences are verified to be less than the predetermined tolerance values of the instrument tolerances of the predicted or calculated distances by robot positioning of the distance sensor, the positional accuracy of the first robot joint has been tested throughout a range of joint angles.

The rotational robot joint accuracy test described above is then repeated for each of the other robot joints. Each joint is moved through its range of motion with the other robot joints being adjusted to direct the distance sensor at a predetermined target point on a surface. It may be possible to utilize a single test surface such as a sphere, which conveniently provides an infinite number of target points and surface orientations. In this case, the center of the sphere may be located relative to the robot by positioning the distance sensor so as to obtain measurements that define the position of the sphere. With the position of the sphere being predetermined, the center of the sphere is also predetermined, and thus the position of the entire surface of the sphere is predetermined, the surface being a constant predetermined radius from the center of the sphere. Then, for all joint position tests, the distance sensor need only be directed at the center of the sphere rather than a fixed point on the surface of the sphere because, knowing the radius of the sphere, the measurement value generated by the distance sensor is predicted to be the distance from the sensor to the center of the sphere minus the radius of the sphere, independent of where the actual measurement point lies on the surface of the sphere. This technique may also be applied to incomplete spheres, such as hemispheres.

Rotational Robot Joint Accuracy Test, Version B

In an alternate embodiment, the rotational robot joint accuracy test proceeds as follows. The robot directs the position sensor toward a stationary object with the robot's first rotational joint positioned near the start of its range of motion. As described above, a spherical surface is a convenient test surface, but any predetermined stationary surface may be used.

The distance sensor measures the distance to the test surface, and the Cartesian coordinates of the point on the surface thus sensed are computed based on this distance sensor measurement and the positional data from the position-determining mechanism.

The robot then moves the distance sensor along a constant radius arc centered on the aforementioned measurement point on the surface. Throughout the motion along the arc, the distance sensor is oriented towards, i.e. directed at, the measurement point. The direction and length of the arc are predetermined such that the first robot joint is required to move through a small portion of its rotational range. Distance sensor measurements are made as the robot joint reaches particular degrees of rotation. The robotic system passes this test if the difference between each distance sensor measurement and each calculated distance based on positional data is less than the predetermined tolerance value based on the radius of the arc and the distance sensor accuracy and robot mechanical accuracy. This initial test verifies that the robot's first joint is accurate within the small portion of its range of motion employed in the test.

The above small range test is then repeated at other positions throughout and approaching the end of the range of motion of the robot's first joint, typically using other measurement surfaces and points for each test. The overall positional accuracy of the robot's first rotational joint is verified when the robotic system passes the above sequence of tests for all points throughout its range of motion.

The above rotational robot joint accuracy test is then repeated for each of the other rotational joints of the robot using appropriate test surfaces and measurement points. The accuracy of all rotational joints in the robotic system is verified when the robotic system passes all tests defined above.

Rotational Robot Joint Accuracy Test Summary

Although the accuracy of the positioning of the distance sensor in the joint accuracy test sequence relies on the simultaneous movement of multiple robot joints, each joint is moved through its entire range and it is extremely unlikely that any error in one joint will be nullified by errors in other joints. Thus, any rotational robot joint that fails to perform correctly at some point in its range is identified by the above test sequence. In a like manner, if there are errors in the self-test directing or evaluating programs, the extensive range of testing above fails at some point if the self-test routine has errors, excepting of course, gross errors in which tests are simply not performed.

Linear Robot Joint Accuracy Test

Testing of the accuracy of the robot's linear translation axis is preferably performed in a manner similar to the above joint tests. This test routine begins by instructing the robot to translate to the end of its linear translation range and to direct the distance sensor at a surface, preferably one that is roughly perpendicular to the direction of translation. A distance measurement is then made and the results are stored in a repository. The robot then moves linearly away from the surface while adjusting the other robot joint angles to keep the distance sensor directed at the same point on the test surface and keeping the distance within the range of the distance sensor. In much the same manner as above, the distance to the target point is predicted/calculated from the position-determining mechanism and compared to the actual measurement value. This procedure is repeated throughout the range of the translation stage, with new test points being selected as needed, until the entire range has been evaluated. In order for the robotic system to pass the linear robot joint accuracy test, the difference between the distance sensor reading and the calculated distance based on positional data at each measurement location must be less than a predetermined tolerance value that is representative of the robot positional accuracy and the distance sensor accuracy and linearity. In some embodiments, the predetermined tolerance value is equal to the sum of the robot positional accuracy and the distance sensor accuracy.

Upon completion of the linear robot joint accuracy test, the positional accuracy of all seven axes of the robot has been tested. Failure of any one of the axis tests indicates a problem with the robot joint calibration, the robot joint position-determining mechanism, or the robot controller firmware that controls robot motion and position.

The Third Series of System Self-Tests

A third series of tests preferably verifies all computer programs, including the algorithms they are based upon, that were developed to command the robotic system to perform the task or tasks to which it is dedicated. These tasks depend upon the type of robotic system being employed and to what purpose, such as positioning a device or tool in a particular orientation relative to an object or work piece. This third test series is preferably designed to be specific to the particular task or tasks assigned to the robot, and thus is not a general test series applicable to all robotic systems. However, the first and second test series verify that the basic robotic system is functioning properly, which makes it possible for this third series of tests to be defined and performed.

In a robotic PELT system, a typical task which the robotic system performs is as follows: The system orients the distance sensor at a specific distance from a location on an object and then orients the distance sensor to be normal to the object's surface. The robotic system then moves the ultrasonic PELT transducer tool to the position previously occupied by the distance sensor tool. Finally, the robotic system places the ultrasonic transducer into contact with, and normal to, the object's surface. PELT layer thickness measurements are made at that location, and the robotic system then lifts the PELT ultrasonic transducer away from the surface. This sequence is then repeated for other locations on the object surface. Each aspect of this process should be tested in this third series of tests to ensure that the computer programs controlling these movements are functioning properly. In the case of a robotic PELT system, this process is preferably divided into three discrete tests, namely normalization, tool change, and tool placement, for the purposes of this third series of tests. Normalization is the orientation of the distance sensor to be normal to the surface. Tool change is the movement of the ultrasonic transducer to the position occupied by the distance sensor. Tool placement is the placement of the ultrasonic transducer into contact with the work piece surface.

Iterative Normalization Test

An iterative normalization test preferably verifies the performance of the normalization computer program, which is the computer program that controls the robotic system so as to position the distance sensor to be normal to a work piece surface. This test evaluates the normalization computer program in such a manner as to reveal any performance problems. There are numerous ways in which an iterative normalization test may be performed, and there are several approaches that may be implemented. What is important in this context is to determine whether the computer program that implements the normalization algorithm is working properly.

To perform this test, a suitable planar test surface must be available. As with previous tests, the test surface may be a floor, wall, or even a planar surface on the stationary base of the robot itself. In this test, the directing or evaluating programs position the distance sensor at a predetermined distance from the test surface that corresponds to the middle of its measurement range.

The normalization computer program is then executed to normalize the distance sensor to the surface. After normalization, the distance to the surface is measured and recorded along with the distance sensor position and angle, which is X, Y, Z in absolute robotic system Cartesian coordinates and angles Theta-X, Theta-Y, Theta-Z. Lastly, the location of the point on the surface at which the distance sensor is directed is calculated in robotic system Cartesian coordinates, and those XYZ coordinates are recorded. The normalization routine is then executed again, preferably with the robot starting in the position established by the first execution of the normalization routine. After the second normalization, the distance sensor position and orientation should be unchanged, within the expected distance sensor measurement error. In addition, the calculated coordinates of the point on the surface toward which the distance sensor is directed should be unchanged.

It has been observed that executing the routine once might result in a correct result due to errors that offset each other. However, repeating the normalization routine with the robot starting from a different position should yield the same result if the normalization routine is working properly. For example, when the robot starts with the distance sensor far from normal, the first execution normalizes the sensor. If the routine is working properly, a second execution of the normalization routine starting at the finishing point of the first normalization results in no change to the robot position. If the position does change by more than some small error resulting from distance sensor inaccuracy, then the routine has a problem or error. In one instance, a robot PELT system normalization routine programmed by a system integrator tilted the distance sensor so as to cause the normalization error to increase by about one degree each time it was executed. After repeating the normalization routine several times, it became evident that the computer program had a fault since the cumulative one-degree movements gradually tilted the sensor quite far from normal. The first time the routine was executed, however, it got close to the normalization value that was desired, and the fault was not detected. Only after subsequent executions of the routine using the finishing robot position as the initial position for the next execution did the error surface.

Failure of the iterative normalization test indicates a problem with the normalization computer programs or the data describing the distance sensor tool center point, which is the point defined relative to the robot wrist that serves as the reference for distance measurements. If the robotic system passes the iterative normalization test, this indicates that the normalization computer programs and tool center point definition are correct, at least to a first level of testing. This test also serves to confirm the results of the first two test series, i.e. that the robotic system itself is functioning properly.

Angular Normalization Test

Following the iterative normalization performed above, the minimum distance from the distance sensor to the planar test surface should be located along the axis of the distance sensor. The angular normalization test verifies that the normalization computer programs have positioned the distance sensor normal to the planar surface.

First, the distance sensor measurement value, Cartesian coordinates, and orientation angles are stored in a repository, such as repository 103. Based on this data, the position of the plane surface in Cartesian coordinates representing the test surface may be computed. If the distance sensor has been initially orientated normal to the planar surface, any angular adjustment results in an increase in the distance sensor measurement.

Assuming a small square pattern of points on the test surface with the distance measurement directed at the center point of the square, the robotic system is then instructed to rotate the distance sensor by a small angle, such as 8 degrees, about the tool center point such that the distance sensor is directed towards one of the corners of the square pattern on the test surface. The expected distance to the surface is then computed from the rotation angle and the other stored information. The predicted distance is compared to the distance sensor value. For the robotic system to pass the angular normalization test, the measured distance value must agree with the calculated value, within the tolerance defined by the robot positioning accuracy and the distance sensor accuracy. In some embodiments, the tolerance is equal to the sum of the robot positioning accuracy and the distance sensor accuracy. The test is then repeated for each of the remaining three corners of the square by rotating the distance center about its tool center point so as to direct it at the corner points, calculating the distance to the surface, and comparing the calculated value to the measured value. Other shapes, including, but not limited to, an equilateral triangle, a regular pentagon, and a regular hexagon, may be used instead of a square for this test.

Failure of the robotic system to pass the angular normalization test indicates an error in the robotic system normalization program.

Parallel Planes Normalization Test

A parallel planes normalization test is a final verification of the normalize program and confirms that the distance sensor's measurement axis is truly perpendicular to the planar target test surface.

In this test routine, the robot is first instructed to normalize the distance sensor to the test surface at a distance that corresponds to the middle of its measurement range. The distance sensor measurement is then stored. The robot then moves the distance sensor in a closed pattern, returning to the original position, in the plane parallel to the test surface, which should also be perpendicular to the distance sensor orientation. At several locations along the closed pattern of motion, a distance sensor measurement is obtained. In order for the robotic system to pass the parallel planes normalization test, the difference between all such distance measurements and the stored initial measurement must be within the tolerance defined by the inaccuracies of the robot positioning and the distance sensor.

Failure of the robotic system to pass the parallel planes normalization test indicates a problem with the robotic system normalization program.

Tool Change Test

A tool change test preferably verifies that the robot is capable of accurately moving the PELT ultrasonic transducer to the position occupied by the distance sensor. A tool change, as used herein, requires the PELT ultrasonic sensor tool center point to be moved to the location of the distance sensor tool center point.

The robot directs the distance sensor at a planar test target at a distance that is roughly at the midpoint of its measurement range, and the normalization routine is executed. The robot positional data, including joint angles and XYZ coordinates, is then stored together with the XYZ Cartesian space coordinates and angles of the distance sensor tool relative to the tool center point in a repository. The tool change program algorithm is then executed so as to move the PELT transducer to the former position of the distance sensor, and the new robot positional data is stored along with the XYZ Cartesian space coordinates and angles of the PELT ultrasonic transducer. In order for the robotic system to pass the tool change test, the difference between stored XYZ Cartesian values for the distance sensor and PELT ultrasonic transducer must be less than the predetermined tolerance value based on the calculated value and the mechanical accuracy of the robot, and the PELT ultrasonic transducer must be directed along the same line with the same angular orientation as the line that the distance sensor possessed. Adjustments should be made for any angular differences between the distance sensor and PELT ultrasonic transducer.

As a secondary verification, the Cartesian coordinates and angles for the distance sensor and PELT ultrasonic transducer may be computed from the stored data, for example using the evaluating program. The computed values should indicate that the PELT ultrasonic transducer's TCP was moved to the former distance sensor TCP and with the PELT transducer oriented along the line formerly defined by the distance sensor axis.

An external observer of this test would observe that the tool center point of the PELT ultrasonic transducer is moved to where the tool center point of the distance sensor previously was. In addition, the angles, if any, between the Z axes for the two tools should also be compensated for by the tool change routine.

Failure of the tool change verification test indicates a problem with the definitions of the tool center points for the distance sensor or PELT ultrasonic transducer or a problem with the tool change program.

Tool Placement Test

A tool placement test tests the computer program and algorithm that place the PELT ultrasonic transducer into contact with a surface.

A tool placement test begins by moving the distance sensor so that it is directed at a planar target surface roughly at the midpoint of its measurement range. The normalization routine is then run. After the normalization routine has run, the distance measurement between the sensor and target surface is recorded and stored together with the robot joint angles and other positional data in a repository.

The robot then moves the distance sensor in a direction along its longitudinal axis away from the surface by a predefined distance such as a distance equal to the distance sensor value that was stored. Moving the distance sensor away from the test surface allows the tool placement test to be performed away from the surface without contacting the PELT tool to the test surface.

The tool placement routine is then run using the stored distance sensor value. Since the distance sensor has been moved to a position that is twice as far from the work piece surface as the stored distance value, the placement actually occurs "in air" rather than on the work piece surface. The placement routine first performs a tool change so that the PELT ultrasonic transducer is moved to the same position and orientation as the distance sensor. The routine then causes the PELT ultrasonic transducer to be moved towards the work piece surface after which the PELT transducer's tool center point should be in the same location and orientation as the original position and orientation of the distance sensor. After this movement is completed, the test routine then verifies that the proper motion was accomplished by calculating the position and orientation of the PELT ultrasonic transducer, using the current robot positional data, and comparing it to the original position and orientation of the distance sensor. In order for the robotic system to pass the tool placement test, the position and orientation must match for the tool center points of both devices, within the mechanical positioning error of the robotic system.

In some cases, the PELT ultrasonic transducer tool, being a spring-loaded device, is programmed to be positioned into the test surface by a desired amount of spring compression. The PELT ultrasonic transducer does not actually penetrate the surface, but stops at the surface while the robot continues to move towards the surface by the desired spring compression. The final position calculated for the PELT ultrasonic transducer, however, based on the robot positional data, is actually slightly past the material surface. Thus, the tool placement test needs to take the spring compression into account, if relevant, when verifying the tool placement results.

Failure of the robotic system to pass the tool placement test indicates a problem with the placement program.

Non-Planar Surface Test

The above-described third series of system self-tests were described for use with planar test surfaces. The above-described third series of tests, except for the parallel planes normalization test, is preferably repeated using a non-planar, and more preferably a curved, test surface, such as a cylinder. The parallel planes normalization test does not work for curved surfaces, because the distance to the surface changes as the distance sensor is moved. This series of tests with a curved test surface verifies that the system performs correctly on curved surfaces given that curved surfaces present the above-described program algorithms with a higher degree of complexity and difficulty.

If any of the tests described herein produces a failed test result, namely the calculated difference is greater than the predetermined tolerance value, a report is preferably generated describing the failure. In some embodiments, human intervention is required to address the failed test and correct the problem.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of self-evaluating the accuracy of a robotic system comprising at least one robot arm comprising at least one positioning joint for positioning the robot arm, at least one distance sensor coupled to the robot arm, a robot controller for directing movement of the robot arm, and at least one position-determining mechanism for determining a position of the positioning joint or the robot arm, and robot control programs residing on a system control computer, the method comprising the steps of:

a computer evaluating repeatability of a distance sensor, comprising the substeps of:
  (a) instructing the robot controller to direct the distance sensor towards a location on a surface, wherein the distance sensor is held stationary with respect to the surface;
  (b) receiving a plurality of distance measurements from the distance sensor;
  (c) storing the received distance measurements in a repository;
  (d) evaluating repeatability of the plurality of distance measurements by comparing maximal deviation from a mean value of the distance measurements for each distance sensor to a predetermined tolerance value; and
  (e) repeating substeps (a) through (d) for each of the other distance sensors to individually evaluate the repeatability of each of the other distance sensors;

the computer evaluating accuracy of each distance sensor, comprising the substeps of:
  (f) instructing the robot controller to direct the distance sensor towards a location on a surface;
  (g) instructing the robot controller to translate the distance sensor along its measurement axis until the sensor is positioned near a first end of its operational range relative to the surface;
  (h) receiving from the distance sensor a first distance measurement of a distance between the distance sensor and the location on the surface and storing the first distance measurement in a repository;
  (i) collecting a first set of robot arm position data from the position-determining mechanism and storing the first position data in the repository;
  (j) instructing the robot controller to translate the distance sensor along its measurement axis, towards the second end of its operational range by an incremental distance, such that the distance sensor remains directed towards the same location on the surface, with the incremental distance representing a fraction of a measurement range of the distance sensor;
  (k) receiving from the distance sensor a second distance measurement for the distance between the distance sensor and the location on the surface and storing the second distance measurement in the repository;
  (l) determining a difference between the second distance measurement and the first distance measurement as a measured distance translation value for the distance sensor;
  (m) collecting a second set of robot arm position data from the position-determining mechanism and storing the second position data in the repository;
  (n) calculating a distance by which the distance sensor was translated using the first set of robot arm position data and the second set of robot arm position data as a calculated distance translation value for the distance sensor;
  (o) comparing the measured distance translation value to the calculated distance translation value and determining whether the measured distance translation value agrees with the calculated distance translation value within a predetermined tolerance value;
  (p) repeating steps (j) through (o) until the distance sensor has been translated to the second end of its distance-sensing range, thereby evaluating measurement accuracy of the distance sensor across its full measurement range;
  (q) repeating steps (f) through (p) for each of the other distance sensors to individually evaluate accuracy of each of the other distance sensors in the robotic system;

the computer evaluating accuracy of movement of the positioning joint, comprising the substeps of:
  (r) instructing the robot controller to move the positioning joint to near a first end of its range of motion;
  (s) instructing the robot controller to position other positioning joints so that a distance sensor is directed towards a location on a surface with the distance to the surface within the measurement range of the distance sensor;
  (t) receiving a third distance measurement value of the distance between the distance sensor and the location on the surface and storing the third distance measurement in a repository;
  (u) collecting a third set of positional data from the position-determining mechanism and storing the third positional data in the repository;
  (v) instructing the robot controller to move the positioning joint by an increment in a direction towards a second end of its range of motion and adjusting the other positioning joints so that the distance sensor remains directed towards the same location on the surface;
  (w) receiving a fourth distance measurement value from the distance sensor for the distance between the distance sensor and the location on the surface and storing the fourth distance measurement in the repository;
  (x) determining a difference between the fourth distance measurement and the third distance measurement as a measured distance translation value for the distance sensor;
  (y) collecting a fourth set of positional data from the position determining mechanism and storing the fourth positional data in the repository;
  (z) calculating the distance by which the distance sensor was translated using the third set of robot arm position data and the fourth set of robot arm position data as a calculated distance translation value for the distance sensor;
  (aa) comparing the measured distance translation value to the calculated distance translation value and determining whether the two values agree to within a predetermined tolerance value thereby evaluating the accuracy of the positioning joint;
  (bb) repeating substeps (s) through (aa) until the positioning joint reaches a second end of its range of motion to evaluate the accuracy of the positioning joint across its full range of motion; and
  (cc) repeating substeps (r) through (aa) for each of the other positioning joints to individually evaluate the accuracy of each of the other positioning joints in the robotic system as well as the accuracy of the robot controller; and the computer evaluating accuracy of a plurality of motions of the robot arm, wherein the motions have been programmed into the robot control program residing on the system control computer, comprising the substeps of:

(i) evaluating a system control program with an evaluating program, wherein the evaluating program comprises a first repository for storing all distance sensor measurement values and robot arm position values employed by the system control program during evaluation;

(ii) storing all distance sensor measurement values and all robot arm-position data employed by the system control program into the first repository, providing a record of the motion of the robot arm;

(iii) assessing the first distance sensor measurement values and robot arm position values stored in the first repository, computing an anticipated second set of robot arm position values, and determining whether the second set of robot arm position values stored in the repository agrees with the computed values to within a predetermined tolerance;

(iv) sequentially evaluating all sets of robot arm position values stored in the repository based on computing anticipated values from prior distance measurement data and robot arm position values to evaluate overall accuracy of the robot system control program; and (v) repeating substeps (ii) through (iv) for the other system control programs;

wherein the computer uses no calibrated reference standards or comparisons to stored baseline references in executing the method.

2. The method of claim 1, wherein the positioning joint comprises at least one rotational joint.

3. The method of claim 1, wherein the positioning joint comprises at least one translational joint.

4. The method of claim 1, wherein the step of the computer evaluating accuracy of at least one routine of the system control programs further comprises the substeps of:

a) the computer directing a normalization procedure to place the distance sensor in a normalized orientation with respect to the test surface, wherein the test surface is planar;

b) the computer directing a distance measurement to the test surface from the distance sensor with the distance sensor in the normalized orientation and storing the distance measurements in the repository;

c) the computer collecting positional data from the position-determining mechanism with the distance sensor in the normalized orientation and storing the positional data in the repository;

d) the computer calculating a location of the test surface at which the distance sensor is directed from the positional data with the distance sensor in the normalized orientation and storing the location in a repository; and e) the computer repeating steps a)-d) for a plurality of normalized orientations; and f) the computer comparing differences of the distance measurements, the positional data, and the locations for each normalized orientation to a predetermined tolerance value to evaluate the normalization procedure.

5. The method of claim 1, wherein the step of the computer evaluating accuracy of at least one routine of the system control programs further comprises the substeps of:

a) the computer directing a normalization procedure to place the distance sensor in a normalized orientation with respect to the test surface, wherein the test surface is planar;

b) the computer directing a distance measurement to the test surface from the distance sensor with the distance sensor in the normalized configuration and storing the distance measurement in the repository;

c) the computer collecting positional data from the position-determining mechanism with the distance sensor in the normalized configuration and storing the positional data in the repository;

d) the computer adjusting the distance sensor to a predetermined angle with respect to the normalized configuration;

e) the computer directing a distance measurement to the test surface from the distance sensor with the distance sensor at the predetermined angle and storing the distance measurement in the repository;

f) the computer collecting positional data from the position-determining mechanism with the distance sensor at the predetermined angle and storing the positional data in the repository;

g) the computer calculating a calculated distance to the test surface based on the distance measurement and the predetermined angle;

h) the computer repeating steps d)-g) for a plurality of predetermined angles; and i) the computer comparing a difference of the distance measurements to the calculated distances to a predetermined tolerance value.

6. The method of claim 1, wherein the step of the computer evaluating accuracy of at least one routine of the system control programs further comprises the substeps of:

a) the computer directing a normalization procedure to place the distance sensor in a normalized orientation with respect to the test surface, wherein the test surface is planar;

b) the computer directing a distance measurement to the test surface from the distance sensor with the distance sensor in the normalized configuration and storing the distance measurement in the repository;

c) the computer moving the distance sensor in a direction parallel to the test surface to a parallel plane position;

d) the computer directing a distance measurement to the test surface from the distance sensor with the distance sensor in the parallel plane position and storing the distance measurement in the repository;

e) the computer repeating steps c)-d) for at least one additional parallel plane position; and f) the computer comparing a difference of the distance measurements to a predetermined tolerance value.

7. The method of claim 1, wherein the robotic system further comprises a tool coupled to the robot arm, the step of the computer evaluating accuracy of at least one routine of the system control programs further comprising the substeps of:

the computer directing a normalization procedure to place the distance sensor in a normalized orientation with respect to the test surface, wherein the test surface is planar;

the computer directing a distance measurement to the test surface from the distance sensor with the distance sensor in the normalized orientation and storing the distance measurement in the repository;

the computer collecting positional data from the position-determining mechanism with the distance sensor in the normalized orientation and storing the positional data in the repository;

the computer directing a tool change procedure to position the tool in place of the distance sensor;

the computer collecting positional data from the position-determining mechanism with the tool at the normalized orientation and storing the positional data in the repository; and the computer comparing a difference of positional data for the distance sensor and for the tool to a predetermined tolerance value to evaluate the tool change procedure.

8. The method of claim 1, wherein the robotic system further comprises a tool coupled to the robot arm, the step of the computer evaluating accuracy of at least one routine of the system control programs further comprising the substeps of:

the computer directing a normalization procedure to place the distance sensor in a normalized orientation with respect to the test surface, wherein the test surface is planar;

the computer directing a distance measurement to the test surface from the distance sensor with the distance sensor in the normalized orientation and storing the distance measurement in the repository;

the computer collecting positional data from the position-determining mechanism with the distance sensor in the normalized orientation and storing the positional data in the repository;

the computer moving the distance sensor away from the test surface to a position at an offset distance farther from the test surface;

the computer directing a tool change procedure to position the tool in place of the distance sensor;

the computer directing a tool placement procedure to position the tool at a position separated from the test surface by the difference between the offset distance and the distance measurement;

the computer collecting positional data from the position-determining mechanism with the tool offset from the test surface; and the computer comparing a difference of positional data for the tool with a calculated tool position to a predetermined tolerance value to evaluate the tool placement procedure.

9. The method of claim 1, wherein the step of the computer evaluating accuracy of at least one routine of the system control programs further comprises the substeps of:

a) the computer directing a normalization procedure to place the distance sensor in a normalized orientation with respect to the test surface, wherein the test surface is non-planar;

b) the computer directing a distance measurement to the test surface from the distance sensor with the distance sensor in the normalized orientation and storing the distance measurements in the repository;

c) the computer collecting positional data from the position-determining mechanism with the distance sensor in the normalized orientation and storing the positional data in the repository;

d) the computer calculating a location of the test surface at which the distance sensor is directed from the positional data with the distance sensor in the normalized orientation and storing the location in a repository; and e) the computer repeating steps a)-d) for a plurality of normalized orientations; and f) the computer comparing differences of the distance measurements, the positional data, and the locations for each normalized orientation to a predetermined tolerance value to evaluate the normalization procedure.

10. The method of claim 1, wherein the step of the computer evaluating accuracy of at least one routine of the system control programs further comprises the substeps of:

a) the computer directing a normalization procedure to place the distance sensor in a normalized orientation with respect to the test surface, wherein the test surface is non-planar and of a predetermined contour;

b) the computer directing a distance measurement to the test surface from the distance sensor with the distance sensor in the normalized configuration and storing the distance measurement in the repository;

c) the computer collecting positional data from the position-determining mechanism with the distance sensor in the normalized configuration and storing the positional data in the repository;

d) the computer adjusting the distance sensor to a predetermined angle with respect to the normalized configuration;

e) the computer directing a distance measurement to the test surface from the distance sensor with the distance sensor at the predetermined angle and storing the distance measurement in the repository;

f) the computer collecting positional data from the position-determining mechanism with the distance sensor at the predetermined angle and storing the positional data in the repository;

g) the computer calculating a calculated distance to the test surface based on the distance measurement and the predetermined angle;

h) the computer repeating steps d)-g) for a plurality of predetermined angles; and i) the computer comparing a difference of the distance measurements to the calculated distances to a predetermined tolerance value.

11. The method of claim 1, wherein the robotic system further comprises a tool coupled to the robot arm, the step of the computer evaluating accuracy of at least one routine of the system control programs further comprising the substeps of:

the computer directing a normalization procedure to place the distance sensor in a normalized orientation with respect to the test surface, wherein the test surface is non-planar;

the computer directing a distance measurement to the test surface from the distance sensor with the distance sensor in the normalized orientation and storing the distance measurement in the repository;

the computer collecting positional data from the position-determining mechanism with the distance sensor in the normalized orientation and storing the positional data in the repository;

the computer directing a tool change procedure to position the tool in place of the distance sensor;

the computer collecting positional data from the position-determining mechanism with the tool at the normalized orientation and storing the positional data in the repository; and the computer comparing a difference of positional data for the distance sensor and for the tool to a predetermined tolerance value to evaluate the tool change procedure.

12. The method of claim 1, wherein the robotic system further comprises a tool coupled to the robot arm, the step of the computer evaluating accuracy of at least one routine of the system control programs further comprising the substeps of:

the computer directing a normalization procedure to place the distance sensor in a normalized orientation with respect to the test surface, wherein the test surface is non-planar;

the computer directing a distance measurement to the test surface from the distance sensor with the distance sensor in the normalized orientation and storing the distance measurement in the repository;

the computer collecting positional data from the position-determining mechanism with the distance sensor in the normalized orientation and storing the positional data in the repository;

the computer moving the distance sensor away from the test surface to a position at an offset distance farther from the test surface;

the computer directing a tool change procedure to position the tool in place of the distance sensor;

the computer directing a tool placement procedure to position the tool at a position separated from the test surface by the difference between the offset distance and the distance measurement;

the computer collecting positional data from the position-determining mechanism with the tool offset from the test surface; and the computer comparing a difference of positional data for the tool with a calculated tool position to a predetermined tolerance value to evaluate the tool placement procedure.

13. The method of claim 1, wherein the method runs automatically without human intervention.

14. The method of claim 1, wherein the method is executed as a program routine.

15. The method of claim 1 further comprising the computer using distance sensor data to monitor an operating environment of the robotic system.

* * * * *